(12) United States Patent
Herzi

(10) Patent No.: US 8,743,712 B1
(45) Date of Patent: Jun. 3, 2014

(54) SYSTEMS AND METHODS FOR AGGREGATING DATA FOR RESOURCES IN A TARGET GROUP OF RESOURCES

(75) Inventor: Dahir Herzi, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 522 days.

(21) Appl. No.: 12/758,242

(22) Filed: Apr. 12, 2010

(51) Int. Cl.
*G01R 31/08* (2006.01)

(52) U.S. Cl.
USPC .......................................................... 370/252

(58) Field of Classification Search
USPC ......... 370/254, 252, 241, 389, 400, 401, 412, 370/428, 429; 709/224, 223, 229, 225, 226, 709/201
See application file for complete search history.

(56) References Cited

U.S. PATENT DOCUMENTS

| | | | | |
|---|---|---|---|---|
| 7,921,200 | B2 * | 4/2011 | Dieberger et al. ............ | 709/224 |
| 2005/0278731 | A1 * | 12/2005 | Cameron et al. ................ | 725/14 |
| 2008/0098089 | A1 * | 4/2008 | Luciani ......................... | 709/219 |
| 2009/0310491 | A1 * | 12/2009 | Ginsberg et al. .............. | 370/241 |
| 2010/0088293 | A1 * | 4/2010 | Daigle et al. .................. | 707/705 |

OTHER PUBLICATIONS

Website: http://www.computer.org/portal/web/csdl/doi/10.1109/MDM.2006.7, *A Meta-Data-Based Data Aggregation Scheme in Clustering Wireless Sensor Networks*, Nara, Japan, May 10-12, ISBN: 0-7695-2526-1 (1 pg.).
Website: http://www.tdwi.org/Publications/WhatWorks/display.aspx?ID=7521, *Data Aggregation—Seven Key Criteria to an Effective Aggregation Solution*, by Rich Ghiossi, Apr. 26, 2005 (3 pgs.).
Website: http://www.lecs.cs.ucla.edu/Publications/papers/krisnamacharib_aggregation.pdf, *The Impact of Data Aggregation in Wireless Sensor Networks*, UCLA (4 pgs.).

* cited by examiner

*Primary Examiner* — Anh Ngoc Nguyen
(74) *Attorney, Agent, or Firm* — Holland & Hart LLP

(57) ABSTRACT

A computer-implemented method for aggregating data for at least one resource in a target group of resources is described. At least one resource in a target group of resources is monitored. Data from the at least one resource are collected in accordance with a single metric. The data collected from the at least one resource are aggregated. A predefined operation is executed on the aggregated data. A single instance of data representative of the aggregated data collected from the at least one resource in the target group of resources is generated.

20 Claims, 8 Drawing Sheets

SYSTEMS AND METHODS FOR AGGREGATING DATA FOR RESOURCES IN A TARGET GROUP OF RESOURCES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Data may be stored on a computer system. The data may reveal characteristics or behaviors of the computer system. The collection of data, however, from multiple computer systems may not be efficient. For example, the collection of data from many computer systems may result in an increased delay to analyze the collected data. As such, benefits may be realized by providing systems and methods for aggregating data for at least one resource in a target group of resources.

SUMMARY

According to at least one embodiment, a computer-implemented method for aggregating data for at least one resource in a target group of resources is described. At least one resource in a target group of resources is monitored. Data from the at least one resource are collected in accordance with a single metric. The data collected from the at least one resource are aggregated. A predefined operation is executed on the aggregated data. A single instance of data representative of the aggregated data collected from the at least one resource in the target group of resources is generated.

In one embodiment, a group metric may be created to identify the target group of resources. The single metric may be selected from the group metric. In one example, the single metric may identify a type of data to collect from the at least one resource in the target group of resources. In one configuration, a policy may be associated with the group metric.

In one embodiment, the predefined operation may be one of the following: sum, max, min, or average. In addition, the single instance of data may be transmitted to a notification server. The single instance of data may be stored in a database and associated with the target group of resources.

In one example, the target group of resources may be a predefined group. In another example, the target group of resources may be a list of resources customized by a user. At least one resource to monitor may be identified that has not installed a monitoring agent.

A computer system configured to aggregate data for at least one resource in a target group of resources is also described. The computer system may include a processor and memory in electronic communication with the processor. The computer system may include a monitoring agent. The agent may be configured to monitor at least one resource in a target group of resources and collect data from the at least one resource in accordance with a single metric. The agent may be further configured to aggregate the data collected from the at least one resource and execute a predefined operation on the aggregated data. In addition, the agent may be configured to generate a single instance of data representative of the aggregated data collected from the at least one resource in the target group of resources.

A computer-program product for aggregating data for at least one resource in a target group of resources is also described. The computer-program product may include a computer-readable medium having instructions thereon. The instructions may include code programmed to monitor at least one resource in a target group of resources and code programmed to collect data from the at least one resource in accordance with a single metric. The instructions may further include code programmed to aggregate the data collected from the at least one resource and code programmed to execute a predefined operation on the aggregated data. In addition, the instructions may also include code programmed to generate a single instance of data representative of the aggregated data collected from the at least one resource in the target group of resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
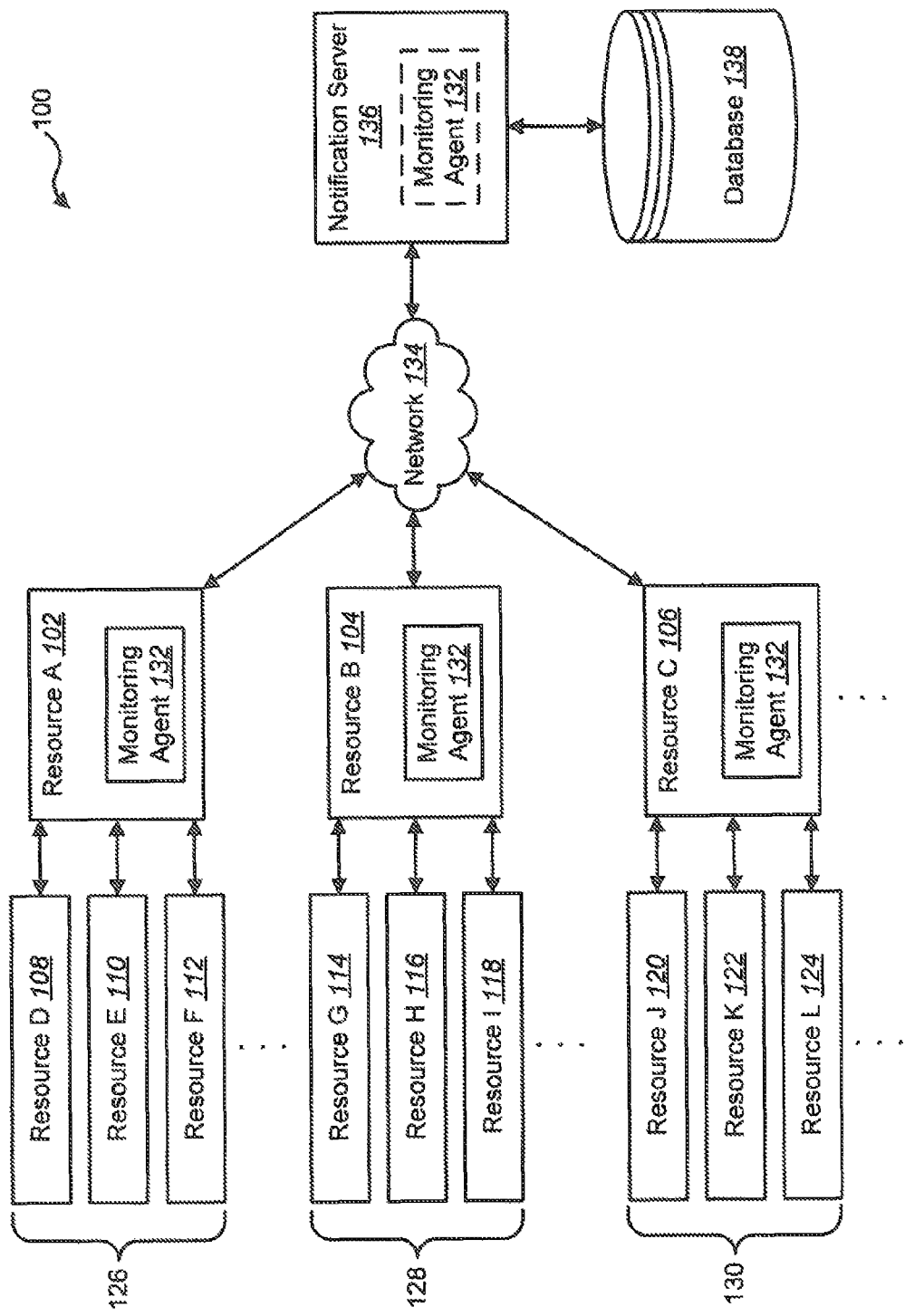
FIG. 1 is a block diagram illustrating one embodiment of an enterprise network environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many organizations have created an enterprise network. An enterprise network may be a geographically dispersed network that is under the jurisdiction of a single organization. The enterprise network may include several different types of computing devices (i.e., resources). Managers of these networks may desire to analyze certain aspects or characteristics of the various resources within the enterprise network. In one example, data may be collected from each resource and a report of the data analysis may be generated for the manager to review. Current techniques to gather data from multiple resources and generate reports based on that data, however, have several shortcomings. For example, the time required to generate a report may be beyond an acceptable range. In addition, many of the calculations performed on the data received from the multiple resources may have to be executed prior to creating the reports. The time needed to perform these calculations may further contribute to the time delay of rendering the reports.

Managing an enterprise network may include monitoring several thousand resources that are within the network. Each resource within the enterprise network may generate a certain amount of data. Typically, the data collected from each resource may be stored in a database. As previously mentioned, the time required to generate a report or perform any type of data manipulation may be a large amount of time because of the high quantity of data received from each computing device within the enterprise network. Typical systems that monitor resources within an enterprise network may implement a 1:1 relationship between the resource that is being monitored and the data collected from that resource in the database. In other words, an instance of data may be stored in the database for each resource within the enterprise network. As a result, the time required to analyze this large quantity of data and generate a report may be substantial.

In one embodiment, the present systems and methods provide a monitoring agent that may aggregate and analyze data from multiple computing devices. In other words, instead of several thousand instances of data representing several thousand resources, the present systems and methods may generate a single instance of data (by aggregating multiple instances of data). The single instance of data may represent characteristics of several thousand resources in a particular location or area within the enterprise network. As a result, the time required to analyze and generate a report relating to certain characteristics of multiple resources within the network may be dramatically reduced.

FIG. 1 is a block diagram illustrating one embodiment of an enterprise network environment 100 in which the present systems and methods may be implemented. In one configuration, one or more resources 102, 104, 106 may communicate with a notification server 136 across a network connection 134. The resources 102, 104, 106 may be a computing device, such as, but not limited to, a personal computer (PC), a server, a laptop, a workstation, a personal digital assistant (PDA), and the like.

In one embodiment, the notification server 136 may include a monitoring agent 132. The server 136 may configure the monitoring agent 132. In one example, the monitoring agent 132 may be configured to gather a particular type of data to from at least one type of resource. The agent 132 may be further configured to perform a pre-defined operation or analysis on the collected data. In one configuration, the monitoring agent 132 may be automatically configured. In one embodiment, the notification server 136 may transmit or send the monitoring agent 132 to at least one resource 102, 104, 106 across the network connection 134. The resources 102, 104, 106 may install or download the monitoring agent 132.

As previously described, the configured monitoring agent 132 may monitor a particular group of resources for a certain type of data. The monitoring agent 132 may collect this type of data from one or more resources in the identified group and aggregate the collected data. For example, resource A 102 may install the monitoring agent 132 that has been configured by the notification server 136. The configured monitoring agent 132 may instruct resource A 102 to monitor a first group 126 of resources 108, 110, 112 and collect a particular type of data from these resources 108, 110, 112.

In one configuration, the monitoring agent 132 may collect and aggregate the data received from each resource 108, 110, 112 within the first group 126. The monitoring agent 132 may then transmit the aggregated data as a single instance of data to the notification server 136. The monitoring agent 132 installed on resource B 104 and resource C 106 may also be configured to collect and aggregate data from a second group 128 of resources and a third group 130 of resources, respectively. The monitoring agent 132 installed on resource B 104 and resource C 106 may collect and aggregate the data received from the multiple resources in the second group 128 and the third group 130. The agent 132 installed on resource B 104 may transmit a single instance of data representative of certain characteristics of the multiple resources 114, 116, 118 in the second group 128 to the notification server 136. The agent 132 installed on resource C 106 may transmit a single instance of data representative of certain characteristics of the multiple resources 120, 122, 124 in the third group 130 to the notification server 136. The database 138 may store each instance of data received by the notification server 136. As a result, in this example, the database 138 may store a first instance of data that is representative of certain characteristics of the multiple resources within the first group 126, a second instance of data that is representative of certain characteristics of the multiple resources within the second group 128, and a third instance of data that is representative of certain characteristics of the multiple resources within the third group 130.

Figure 2:
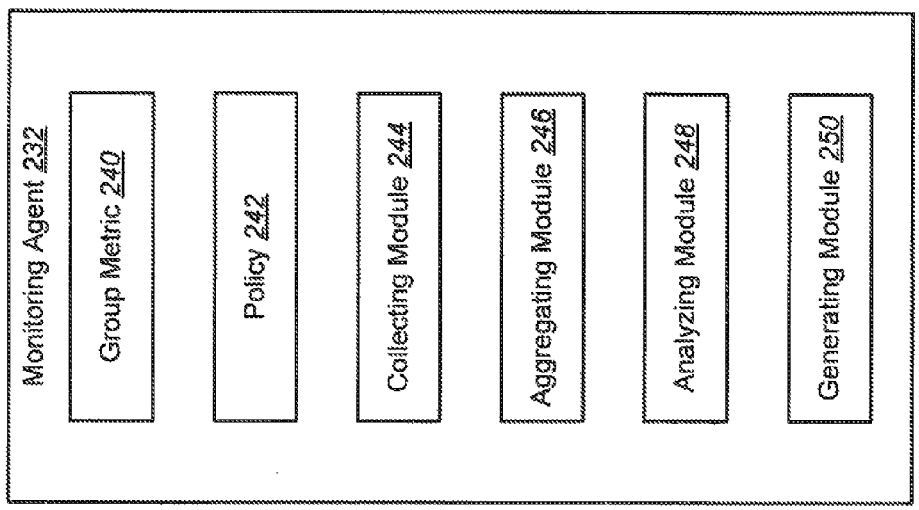
FIG. 2 is a block diagram illustrating one embodiment of a monitoring agent.

FIG. 2 is a block diagram illustrating a further embodiment of a monitoring agent 232. The agent 232 may collect and aggregate data from multiple resources within a predefined target group. In one configuration, the monitoring agent 232 may include a group metric 240, a policy 242, a collecting module 244, an aggregating module 246, an analyzing module 248, and a generating module 250.

In one example, the group metric 240 may gather a specific type of data from one or more resources belonging to a specific group. A group may be defined as collection of resources that have been discovered by the monitoring agent 232 based on qualities that each of the resources possesses. The resources to monitor in the group may not include the monitoring agent 232. In other words, the monitoring agent 232 may monitor and collect data from "agentless" resources in the specific group. In one embodiment, a group may be a pre-defined list of resources (e.g., "all resources", "network resources", "all Dell printers", "all computers without a monitoring agent", and the like). The group may also comprise a certain type of resource in a particular location of an enterprise network. For example, the resources that are targeted by the monitoring agent 232 may be "all resources" in location A of the enterprise network. The target group of resources may also be a user-created list of resources.

In one embodiment, the policy 242 may describe or indicate the type of data that are to be collected and aggregated. For example, the policy 242 may be a "power usage" policy, a "CPU usage" policy, and the like. The collecting module 244 may collect the specified type data from one or more resources in the target group. In one embodiment, the aggregating module 246 may aggregate the data collected by the collecting module 244 from multiple resources of a target group within an enterprise network. In one embodiment, the analyzing module 248 may analyze the aggregated data and a generating module 250 may generate a single instance of the data representing the aggregated data. In one configuration, the single instance of data may be transmitted to the notification server 136. The data may then be stored in the database 138. The single instance of data may be representative of the data collected from the multiple resources of the target group.

Figure 3:
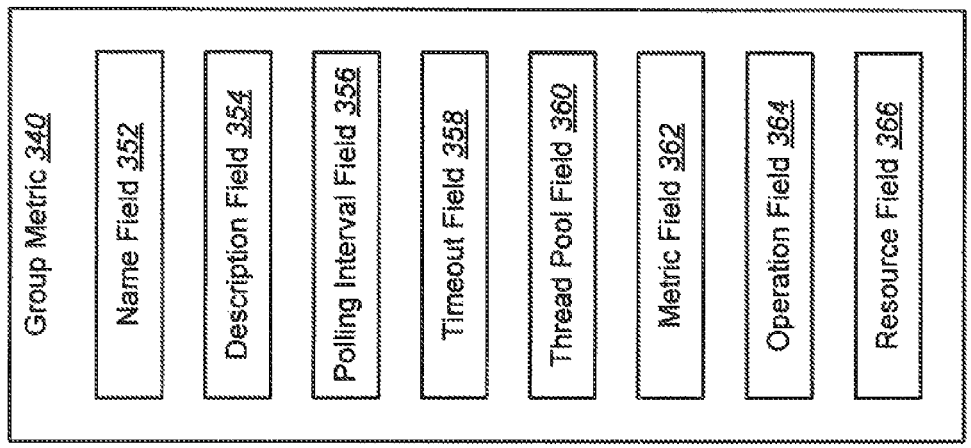
FIG. 3 is a block diagram illustrating one embodiment of a group metric.

FIG. 3 is a block diagram illustrating a further embodiment of a group metric 340. The group metric 340 may be a user interface that includes one or more fields that interface with a user. In one example, the group metric 340 may include a name field 352. The name field 352 may include a name assigned to the group metric 340. In one embodiment, the name field 352 may include a specific location within an enterprise network. For example, the name field 352 may include the name of a county, city, state, country, and the like that includes resources that are part of the enterprise network. A description field 354 may provide a further description of the group metric 340. For example, a user may enter a brief description in the description field 354 that further describes the location entered in the name field 352. In another example, the description field 354 may describe a particular type of resource that is to be monitored within the enterprise.

In one embodiment, the group metric 340 may also include a polling interval field 356. The polling interval field 356 may indicate an interval of time that a group of resources are polled for data. In addition, the group metric 340 may include a timeout field 358. The timeout field 358 may indicate an interval of time before a timeout occurs for the monitoring agent 132. In one embodiment, the group metric 340 may also include a thread pool field 360. The thread pool field 360 may indicate the type of delay associated with the group metric 340. For example, the thread pool field 360 may indicate a high latency or a low latency.

The group metric 340 may further include a metric field 362. The metric field 362 may indicate the type of data that are to be collected, aggregated, and analyzed by the monitoring agent 132. The metric field 362 may be similar to the policy 242. In one example, the metric field 362 may indicate that data relating to a specific characteristic of resources are to be collected and aggregated. Examples of these types of data may include CPU usage, power usage, and the like. The group metric 340 may further include an operation field 364. The operation field may indicate the type of operation that is to be done on the data collected according to the metric field 362. Examples of the operations may include a sum, min, max, average, and the like. Further, the group metric 340 may include a resource field 366. The resource field 366 may indicate a resource group that will be targeted. The target group indicated by the resource field 366 may be a predetermined group or a user may create a specific group.

Figure 4:
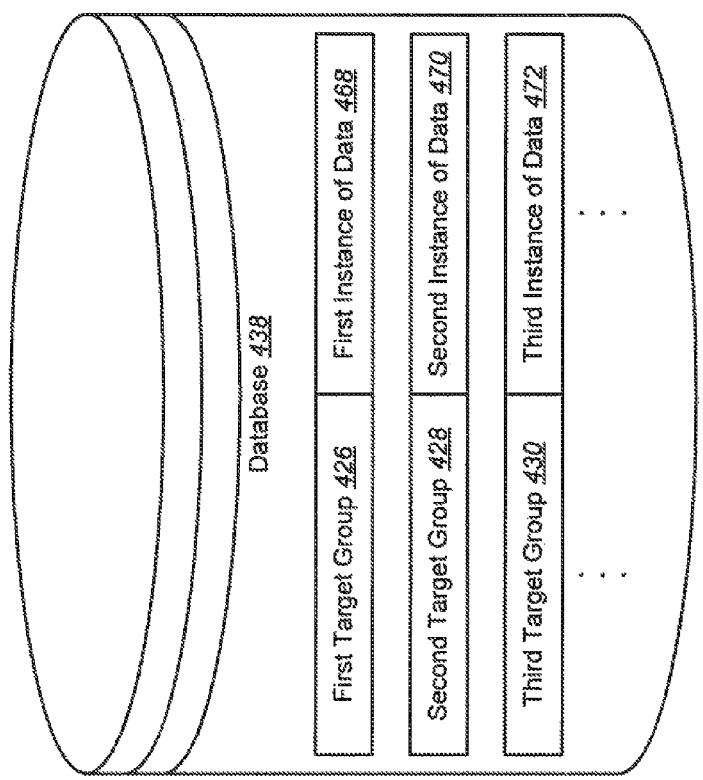
FIG. 4 is a block diagram illustrating one embodiment of a database that may be used in accordance with the present systems and methods.

FIG. 4 is a block diagram illustrating one embodiment of a database 438 that may be used in accordance with the present systems and methods. In one embodiment, the database 438 may include one or more instances of data 468, 470, 472. Each instance of data may be associated with a target group of resources 426, 428, 430. Each target group of resources may include one or more computing devices or resources. For example, a first target group 426 may include multiple resources. A first instance of data 468 may include aggregated data that are representative of a characteristic of the resources belonging to the first target group 426. Similarly, a second target group 428 may represent a second group of resources. A second instance of data 470 may be aggregated data that are representative of the various resources that belong to the second target group 428. Further, a third target group 430 may represent resources of a different target group. A third instance of data 472 may be data that have been aggregated to represent the group of resources that belong to the third target group 430.

As an example, the monitoring agent 132 may be installed on a resource (or computing device) that belongs to the first target group 426. The monitoring agent 132 may monitor the additional resources that also belong to the first target group 426. The agent 132 may collect data from each resource in the first target group 426 that relate to the power usage of each resource. The monitoring agent 132 may aggregate the data received from each resource. As a result, the monitoring agent 132 may generate the first instance of data 468 that are a single instance of data representing the power usage of the resources belonging to the first target group 426. The first instance of data 468 may be stored in the database 438 and may be associated (or linked) with the first target group 426.

Figure 5:
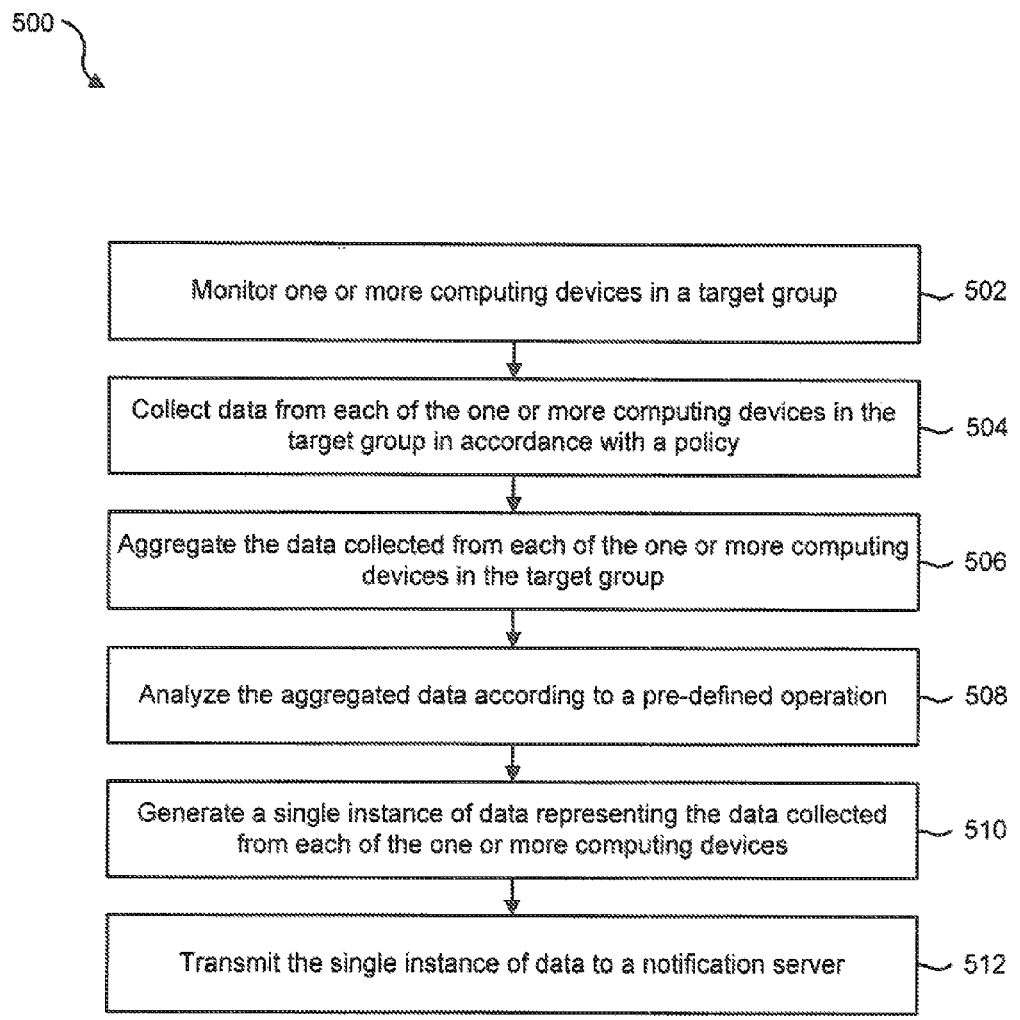
FIG. 5 is a flow diagram illustrating one embodiment of a method for collecting and aggregating data from multiple resources within a target resource group.

FIG. 5 is a flow diagram illustrating one embodiment of a method 500 for collecting and aggregating data from multiple resources within a target resource group. In one embodiment, the method 500 may be implemented by the monitoring agent 132.

In one configuration, one or more resources in a target group may be monitored 502. Data from each of the one or more resources in the target group may be collected 504 in accordance with a policy. For example, the policy may be, but is not limited to, a power usage policy, a CPU usage policy, and the like. The data may be collected from each of the one or more resources in the target group and aggregated 506. The aggregated data may be analyzed 508 according to a predefined operation. In one embodiment, one or more operations may be performed on the aggregated data. For example, the operations that may be performed on the aggregated data may be, but are not limited to, a sum operation, a min operation, a max operation, an average operation, and the like.

In one embodiment, a single instance of data representing the data collected from each of the one or more resourced in the target group may be generated 510. The single instance of data may be transmitted 512 to a notification server and stored in a database. In one configuration, the single instance of data may be associated with (or linked to) the target group of resources being monitored. A user may access the stored instance of data to generate a report regarding the resources in the target group. In one example, the user may select a metric for the report (for example, the user may select a power usage metric), the target group, and a time period. A report may be generated for the user that is representative of the power usage of the resources within the target group during the specified time period.

Figure 6:
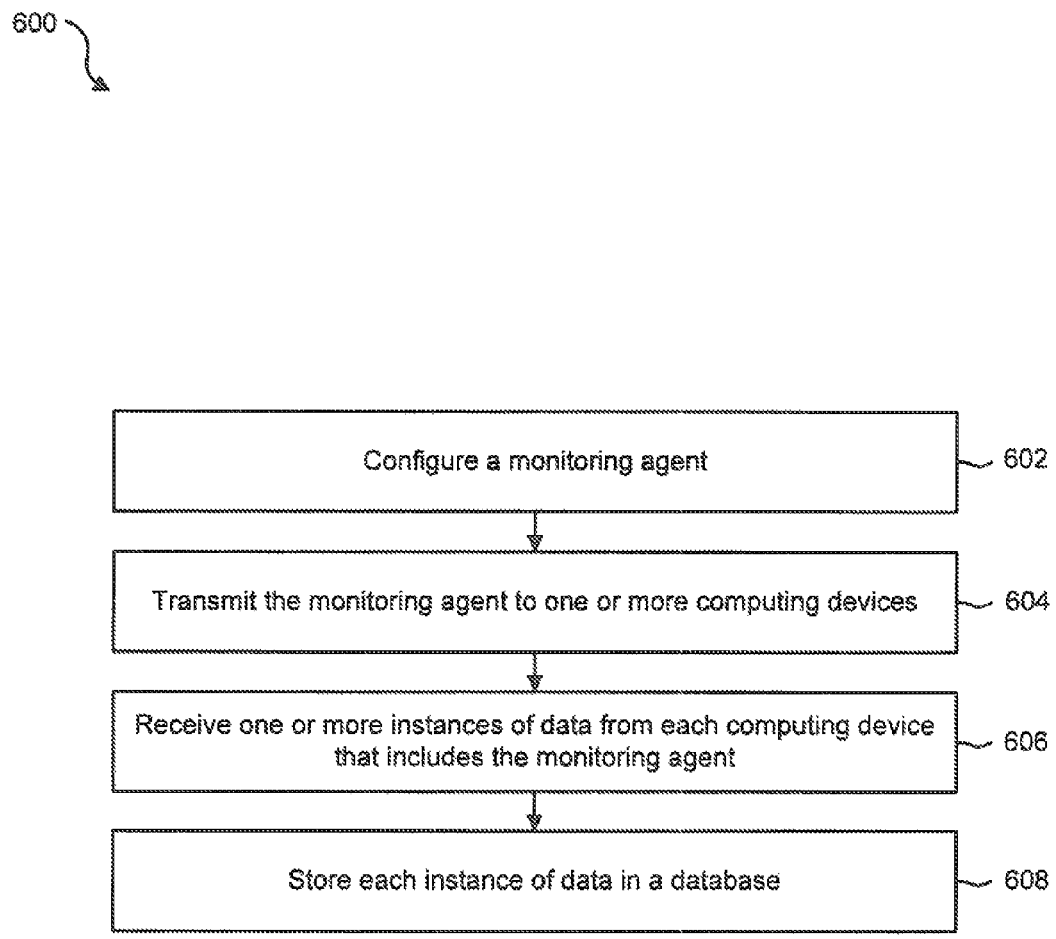
FIG. 6 is a flow diagram illustrating one embodiment of a method for configuring the monitoring agent.

FIG. 6 is a flow diagram illustrating one embodiment of a method 600 for configuring the monitoring agent 132. In one embodiment, the method 600 may be implemented by the notification server 136.

In one example, a monitoring agent may be configured 602. The monitoring agent may be configured 602 with a group metric 240 and a policy 242. As previously described, the group metric 240 and the policy 242 may indicate the type of data to be collected, the target group of resources from which the data are collected, the location of the target group of resources, and the like. The monitoring agent may be transmitted 604 to one or more resources. One or more instances of data may be received 606 from each resource that receives the monitoring agent. Further, each instance of data may be stored 608 in a database and associated with a target group of resources.

Figure 7:
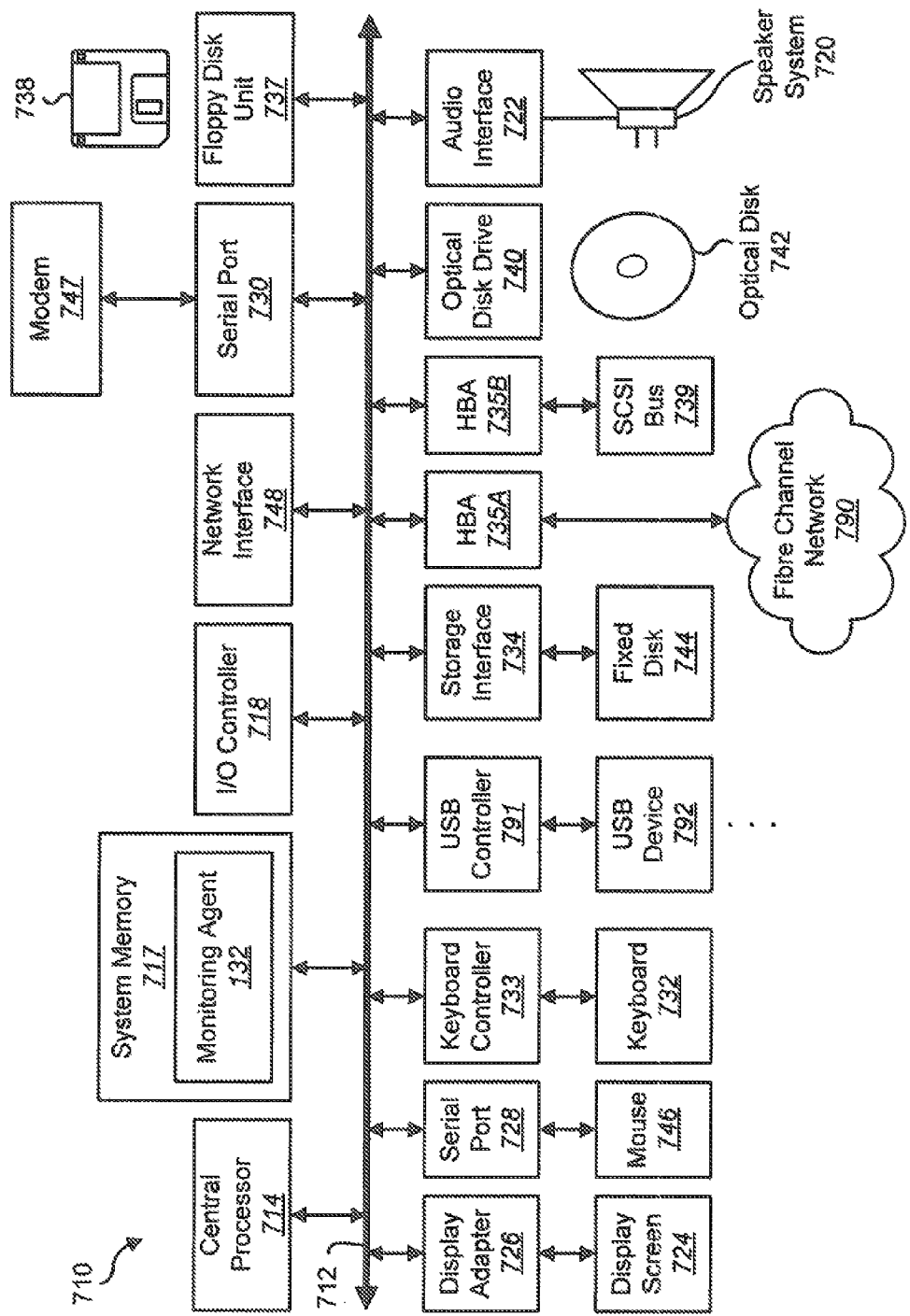
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), multiple USB devices 792 (interfaced with a USB controller 790), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring agent 132 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present systems and methods. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable medium such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
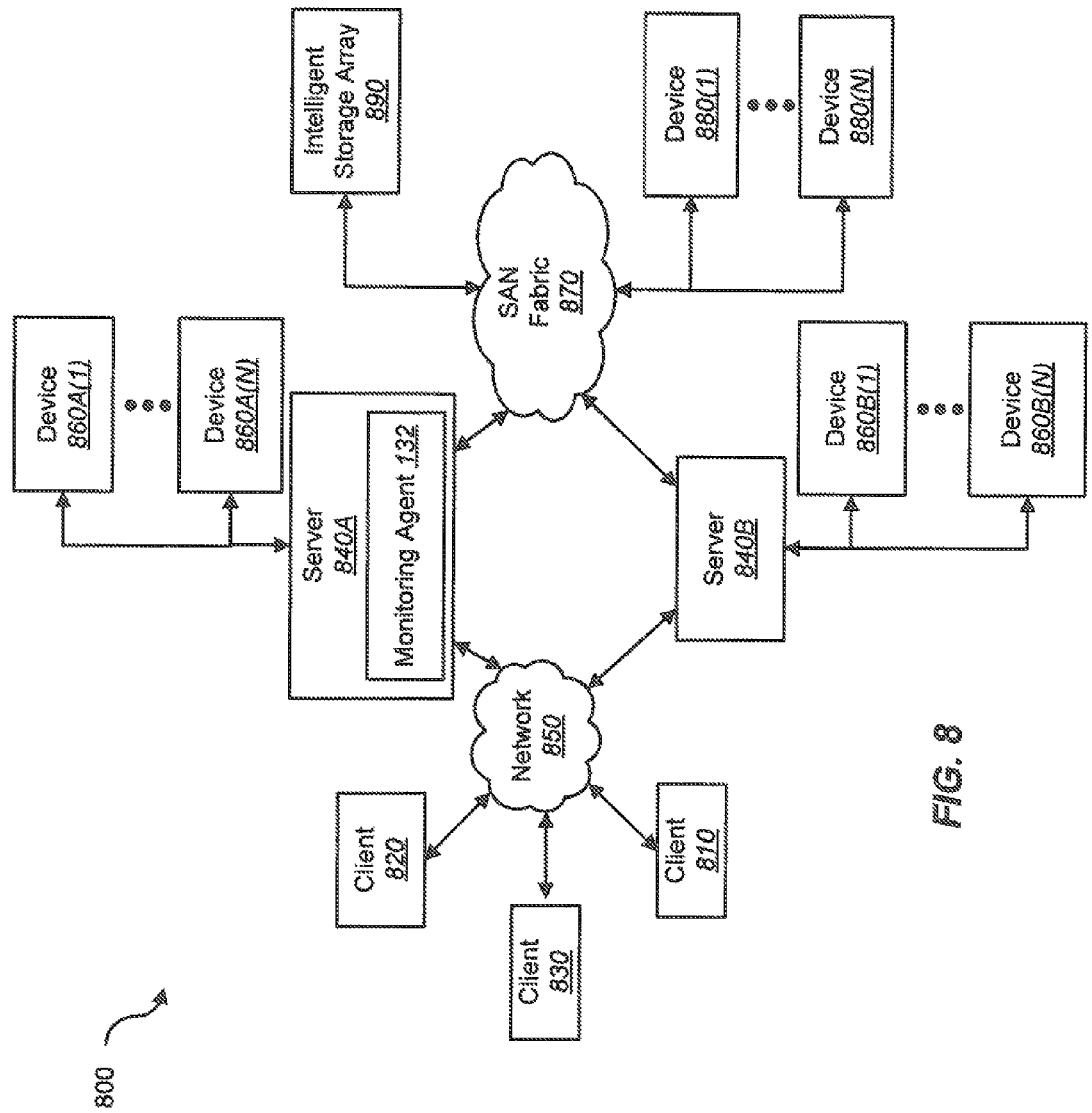
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A and 840B (any of which can be implemented using computer system 810), are coupled to a network 850. In one embodiment, the monitoring agent 132 may be located within a server 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820, and 830 to network 850. Client systems 810, 820, and 830 are able to access information on storage server 840A or 840B using, for example, a web browser or other client software (not shown). Such a client allows client systems 810, 820, and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for aggregating data for at least one resource in a target group of resources, comprising:
   monitoring, by a processor of a host resource, the host resource and at least one other resource in a target group of resources, the at least one other resource being different than the host resource;
   collecting, by the processor, data from the host resource and the at least one other resource in accordance with a single metric;
   aggregating, by the processor, the data collected from the host resource and the at least one other resource;
   analyzing, by the processor, the aggregated data, wherein analyzing the aggregated data comprises executing a predefined operation on the aggregated data;
   generating, by the processor, a single instance of data representative of the analyzed data; and
   transmitting the single instance of data to a server.

2. The method of claim 1, further comprising creating a group metric to identify the target group of resources.

3. The method of claim 2, further comprising selecting the single metric from the group metric, wherein the single metric identifies a type of data to collect from the at least one resource in the target group of resources.

4. The method of claim 2, further comprising associating a policy with the group metric.

5. The method of claim 1, wherein the predefined operation comprises one of the following: sum, max, min, or average.

6. The method of claim 1, wherein the server is a notification server, and wherein the single instance of data is stored in a database and associated with the target group of resources.

7. The method of claim 1, wherein the target group of resources is a predefined group.

8. The method of claim 1, wherein the target group of resources is a list of resources customized by a user.

9. The method of claim 1, further comprising identifying at least one resource to monitor that has not installed a monitoring agent.

10. A computer system configured to aggregate data for at least one resource in a target group of resources, comprising:
    a processor;
    memory in electronic communication with the processor; and
    instructions stored in the memory, the instructions executable by the processor to:
       monitor the computer system and at least one other resource in a target group of resources, the at least one other resource being different than the computer system;
       collect data from the computer system and the at least one other resource in accordance with a single metric;
       aggregate the data collected from the computer system and the at least one other resource;
       analyze the aggregated data, wherein analyzing the aggregated data comprises executing a predefined operation on the aggregated data;
       generate a single instance of data representative of the analyzed data; and
       transmit the single instance of data to a server.

11. The computer system of claim 10, wherein the instructions are executable by the processor to create a group metric to identify the target group of resources.

12. The computer system of claim 11, wherein the instructions are executable by the processor to select the single metric, wherein the single metric identifies a type of data to collect from the at least one resource in the target group of resources.

13. The computer system of claim 11, wherein the instructions are executable by the processor to associate a policy with the group metric.

14. The computer system of claim 10, wherein the predefined operation comprises one of the following: sum, max, min, or average.

15. The computer system of claim 10, wherein the server is a notification server, and wherein the single instance of data is stored in a database and associated with the target group of resources.

16. The computer system of claim 10, wherein the target group of resources is a predefined group.

17. The computer system of claim 10, wherein the target group of resources is a list of resources customized by a user.

18. The computer system of claim 10, wherein the instructions are executable by the processor to identify at least one resource to monitor that has not installed a monitoring agent.

19. A computer-program product for aggregating, by a processor of a host resource, data for at least one resource in a target group of resources, the computer-program product comprising a non-transitory computer-readable medium storing instructions thereon, the instructions being executable by the processor to:
    monitor the host resource and at least one other resource in a target group of resources, the at least one other resource being different than the host resource;
    collect data from the host resource and the at least one other resource in accordance with a single metric;
    aggregate the data collected from the host resource and the at least one other resource;
    analyze the aggregated data, wherein analyzing the aggregated data comprises executing a predefined operation on the aggregated data;
    generate a single instance of data representative of the analyzed data; and
    transmit the single instance of data to a server.

20. The computer-program of claim 19, wherein the instructions are executable by the processor to:
    create a group metric to identify the target group of resources.

\* \* \* \* \*